United States Patent [19]

Nishihira et al.

[11] 4,330,578

[45] May 18, 1982

[54] SYNTHETIC RESIN DECORATIVE ARTICLE AND PROCESS FOR PRODUCING SAME

[75] Inventors: Yoshitaka Nishihira; Harumasa Kato, both of Yokohama, Japan

[73] Assignee: Mitsubishi Rayon Co., Ltd., Tokyo, Japan

[21] Appl. No.: 83,517

[22] Filed: Oct. 10, 1979

[51] Int. Cl.³ .............................................. A47G 29/10
[52] U.S. Cl. ...................................... 428/13; 40/2 A; 428/28
[58] Field of Search .............. 428/13, 28, 67; 40/2 A, 40/330

[56] References Cited

U.S. PATENT DOCUMENTS

| | | | |
|---|---|---|---|
| 1,984,069 | 12/1934 | Larter | 40/2 A X |
| 2,451,913 | 10/1948 | Brice | 428/13 X |
| 2,577,320 | 12/1951 | Fenyo | 428/13 X |
| 2,622,991 | 12/1952 | Sturm | 156/277 X |
| 3,086,268 | 4/1963 | Chaffin, Jr. | 40/2 A X |
| 3,616,192 | 10/1971 | Sinclair | 428/414 X |

*Primary Examiner*—Henry F. Epstein
*Attorney, Agent, or Firm*—Cushman, Darby & Cushman

[57] ABSTRACT

A synthetic resin decorative article comprising a molded body of thermoplastic resin obtained by double injection and a layer of a cured thermosetting resin ink of a desired pattern enclosed in the molded body, at least one side of said decorative article being transparent, so that the cured thermosetting resin ink layer can be seen from the surface of said at least one side. The decorative article has a high decorative effect and is produced by a process comprising double injection molding steps and an intermediate printing step.

8 Claims, 2 Drawing Figures

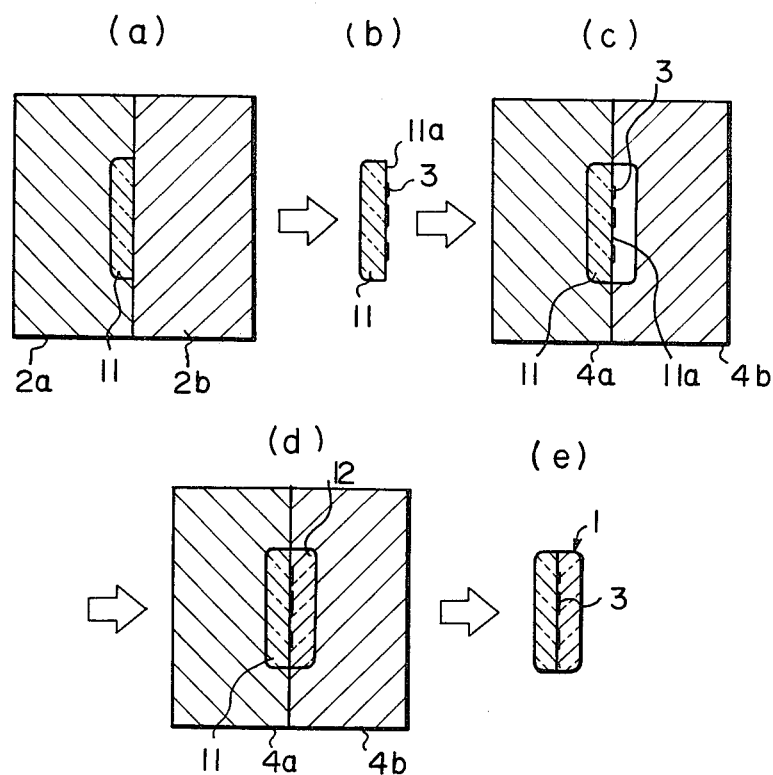
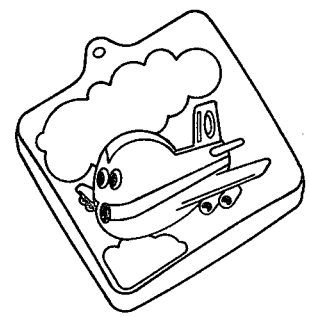

4,330,578

SYNTHETIC RESIN DECORATIVE ARTICLE AND PROCESS FOR PRODUCING SAME

BACKGROUND OF THE INVENTION

1. Field of the Invention

The invention relates to synthetic resin decorative articles in which a print layer is enclosed and to a process for the industrial production thereof.

2. Description of Prior Art

Synthetic resin decorative articles in which an artificial flower or the like is enclosed have hitherto been well known. The general process for producing such decorative articles comprises putting a liquid resin into a mold in which an artificial flower or the like is located to cast polymerize the liquid resin. However, this process has the drawbacks that the process requires a considerable amount of time for the polymerization and that a great deal of skill is required to prevent the foaming of the resin at the time the liquid resin is put into the mold. Therefore, this process is uneconomical. Further, in such cast polymerization, it is difficult to enclose a printed letter, pattern or the like directly in the formed resin article. Thus, in a case where a printed letter, pattern or the like is to be enclosed in the article, it has been the practice to employ a base sheet, such as a sheet of paper or the like, on which a letter, pattern or the like is printed. However, the use of such a printed base sheet may provide a decorative article having an inferior appearance, since the base sheet itself can be seen and, where a sheet of paper is used, the printed letter, pattern or the like can not be seen from the reverse side.

BRIEF SUMMARY OF THE INVENTION

It is an object of the present invention to provide a synthetic resin decorative article having a high decorative effect. Particularly, the object of the present invention is to provide a key holder made of synthetic resin and having a high decorative effect.

Another object of the present invention is to provide a process capable of easily and efficiently producing such a synthetic resin decorative article.

The present invention provides a synthetic resin decorative article comprising a molded body of thermoplastic resin and a layer of a cured thermosetting resin ink of a desired pattern enclosed in the molded body, at least one side of said decorative article being transparent, so that the cured thermosetting resin ink layer can be seen from the surface of said at least one side.

According to the present invention, there is also provided a process for producing a synthetic resin decorative article, which comprises the steps of:

(A) forming in a mold, with a thermoplastic resin, a molded piece to constitute a part of the decorative article by injection molding;

(B) removing the molded piece from the mold and, thereafter, applying a thermosetting resin ink to form a layer of a desired printed pattern on a surface of the molded piece to be enclosed in the decorative article and curing the thermosetting resin ink layer;

(C) locating the printed molded piece in a second mold for the decorative article in such a manner that the surface having the cured thermosetting resin ink layer thereon faces the space in the mold to be filled with an additional amount of thermoplastic resin;

(D) injecting the additional amount of thermoplastic resin into the cavity of the second mold to form a molded article in which the cured thermosetting resin ink layer is enclosed, and then;

(E) removing the molded article from the second mold and, optionally, subjecting the molded article to finishing.

BRIEF DESCRIPTION OF THE DRAWINGS

FIG. 1 is a cross-sectional view wherein the respective steps of the process of the invention are schematically illustrated in (a) through (e).

FIG. 2 is a perspective view schematically illustrating an embodiment of the synthetic resin decorative article of the invention.

DETAILED DESCRIPTION OF THE INVENTION

The present invention will now be illustrated in detail with reference to the accompanying drawings.

Referring to FIG. 1, according to the process of the present invention, a molded piece 11 is first formed, with a thermoplastic resin by injection molding, under conventional conditions, using a pair of mold pieces 2a and 2b, as illustrated in FIG. 1(a) (Step (A)). Although the molded piece 11 illustrated in FIG. 1 has a shape such that the resulting decorative article 1 is cut nearly in half, it is not always necessary that the molded piece 11 have such a shape. However, it is preferable that a surface 11a of the molded piece to be enclosed in the resulting decorative article be flat, because a desired pattern has to be printed on the surface 11a in a subsequent step. The thermoplastic resins usable for the molding of the piece 11 may include methacrylate resins, styrene resins, polycarbonate resins, styrene-acrylonitrile resins and the like. Among these resins, the methacrylate resins are most suitable in view of their excellent properties, such as transparency and weather resistance. In general, it is preferable that the resins be colorless and transparent. However, the resins may be colored but transparent, or may be translucent or opaque in a case where a cured thermosetting resin ink layer enclosed in the resulting decorative article is to be seen from only one side of the article.

Then, after removing the molded piece 11 from the molds 2a and 2b, a printed ink layer 3 of desired pattern is formed on the surface 11a as illustrated in FIG. 1(b) (Step (B)). In this step, the ink layer 3 is applied to form a desired printed pattern on the surface 11a and, then, cured under a conventional condition. The printing should be carried out using a thermosetting resin ink, such as an epoxy resin ink. If a thermoplastic resin is used, the printed pattern will be deformed during the injection molding in the subsequent step (D). The printing may be effected by a usual printing method, such as screen printing. If the layer 3 of a cured thermosetting resin ink is to be seen from both sides of the resulting article, it is preferable that the printing be carried out two times or more so as to prevent the printed letters and the like from appearing reversed from one side. In this in-vention, the printing may be carried out three times or more so as to form a printed ink layer on which the same pattern can be seen from either side. However, it should be noted that, if the printed ink layer 3 becomes extremely thick, the printed pattern may be deformed by the melt flow of the resin during the subsequent injection molding. In FIG. 1(b), a cross-section of the molded piece 11 is illustrated.

The molded piece having the layer 3 formed as mentioned above is then located in a pair of second mold pieces 4a and 4b for the decorative article, so that the surface 11a having the layer 3 thereon faces the space defined between the mold pieces, as illustrated in FIG. 1(c), in which space an additional amount of thermoplastic resin is to be filled. In this step (C), the molded piece 11 must be placed in the mold so that the surfaces other than the printed surface is brought into close contact with the cavity wall of one of the mold pieces. Thus, the mold pieces should be formed with a high precision. It may be advantageous, for stably holding the molded piece 11 in one of the mold pieces 4a and 4b, to draw the molded piece towards the cavity wall of one of the mold pieces by means of a suction force.

Then, the molded article 1 is formed by injecting the additional amount of thermoplastic resin 12 into the cavity of the second mold composed of the mold pieces 4a and 4b, as illustrated in FIG. 1(d) (Step (D)). The thermoplastic resins usable in this step may include the resins as mentioned above with respect to the step (A). In general, it is preferable to employ a resin of the same type as that employed in the step (A). However, while it is preferable that the resin to be employed in this step be colorless and transparent, the resin may be colored and translucent or opaque. However, for the purpose of this invention, at least one of the resins employed in the steps (A) and (B) should be transparent. The injection molding in this step, as well as in the step (A), may be carried out in a usual manner. However, in this step, the injection pressure is preferably somewhat lowered from that in usual injection molding. In this regard, in this step, the injection pressure is preferably about 50 kg/cm² higher than a short shot pressure. Also this step is preferably completed in 3 to 10 seconds.

After the completion of the injection molding, the molded article 1, as illustrated in FIG. 1(e), is removed from the second mold and, if desirable or appropriate, the molded article 1 is then subjected to finishing. Although the mold should be formed with a high precision so that finishing is unnecessary, finishing such as cutting, shaving, preforating, grinding or the like may be necessary if a configuration of the decorative article is desired which is difficult to obtain from a mold.

The synthetic resin decorative article of the invention produced by the process described above in detail, which may be referred to as "double injection" for brevity, has a cured thermosetting resin ink layer enclosed therein which is naturally integrated with the resin body and, thus, has a high decorative effect. This may be understood from FIG. 2 in which an embodiment of the decorative article of the present invention is schematically illustrated.

The invention will further be illustrated below by a non-limitative example.

EXAMPLE

A synthetic resin decorative article, as illustrated in FIG. 2, useful for a key holder was prepared using a methacrylate resin.

A molded piece was formed by injection molding a methacrylate resin (Acrypet MD, made by Mitsubishi Rayon Co., Ltd., transparent) using an injection molding machine (Type V-15-75, made by Nihon Seikohsho Co., Ltd.). Then, a pattern was printed on a surface of the molded piece, which surface was enclosed in the resulting article as illustrated in FIG. 1, by applying thereto a thermosetting resin ink (Type SS-25000 epoxy resin ink, made by Toyo Ink K.K.) and, then, subjecting the printed ink layer to curing at 80° C., for 30 minutes. The otained molded piece with a surface having the printed ink layer thereon was placed in a mold for forming the decorative article so that the printed surface faced the space in the mold as shown in FIG. 1(c). Then, the injection molding as mentioned above was again carried out and the space in the mold was filled with an additional amount of the methacrylate resin. The decorative article thus obtained had a beautiful appearance in which the cured thermosetting resin ink layer was enclosed in the molded body of transparent resin and in which there was no deformation of the printed pattern.

For comparison purposes, the above mentioned procedure was repeated, except that a thermoplastic resin ink (Type SS-8500, made by Toyo Ink K.K.) was used instead of the thermosetting resin ink, and a decorative article was prepared. The printed pattern of the obtained article was deformed and, thus, the article was not of commercial quality.

What is claimed is:

1. A synthetic resin decorative article consisting essentially of two injection molded, superimposed thermoplastic resin bodies and at least one integral layer of a cured thermosetting resin ink in a desired pattern directly printed on one side of one body and fully enclosed within the molded bodies joined together by injection molding, at least one side of said decorative article being transparent so that the cured thermosetting resin ink layer can be seen from the surface of said at least one side.

2. A synthetic resin decorative article consisting essentially of two injection molded, superimposed thermoplastic resin bodies and at least three integral layers each of a cured thermosetting resin ink printed in a desired pattern directly on one side of one body and fully enclosed within the molded bodies joined togeher by injection molding, at least one side of said decorative article being transparent so that the cured thermosetting resin ink layers can be seen from the surface of said at least one side.

3. A synthetic resin decorative article consisting essentially of two injection molded, superimposed thermoplastic resin bodies and at least three integral layers each of a cured thermosetting resin ink printed in a desired pattern directly on one side of one body and fully enclosed within the molded bodies joined together by injection molding both sides of said decorative article being transparent so that the cured thermosetting resin ink layers form a pattern and wherein the same pattern can be seen from the surface of either side.

4. The synthetic resin decorative article according to claims 1, 2 or 3, wherein the thermoplastic resin is selected from the group consisting of methacrylate, styrene, polycarbonate and styrene-acrylonitrile resins.

5. The synthetic resin decorative article according to claim 4, wherein the thermoplastic resin is a methacrylate resin.

6. A synthetic resin decorate article according to claims 1 or 2, wherein both sides of said decorative article are transparent.

7. The synthetic resin decorative article according to claims 1, 2 or 3, wherein said article is in the form of a key holder.

8. The synthetic resin decorative article according to claim 1 wherein the same pattern can be seen from either side.

* * * * *